Aug. 11, 1931.  A. C. GOUGH  1,818,474
GAFF HOOK
Filed Aug. 10, 1928  2 Sheets-Sheet 1
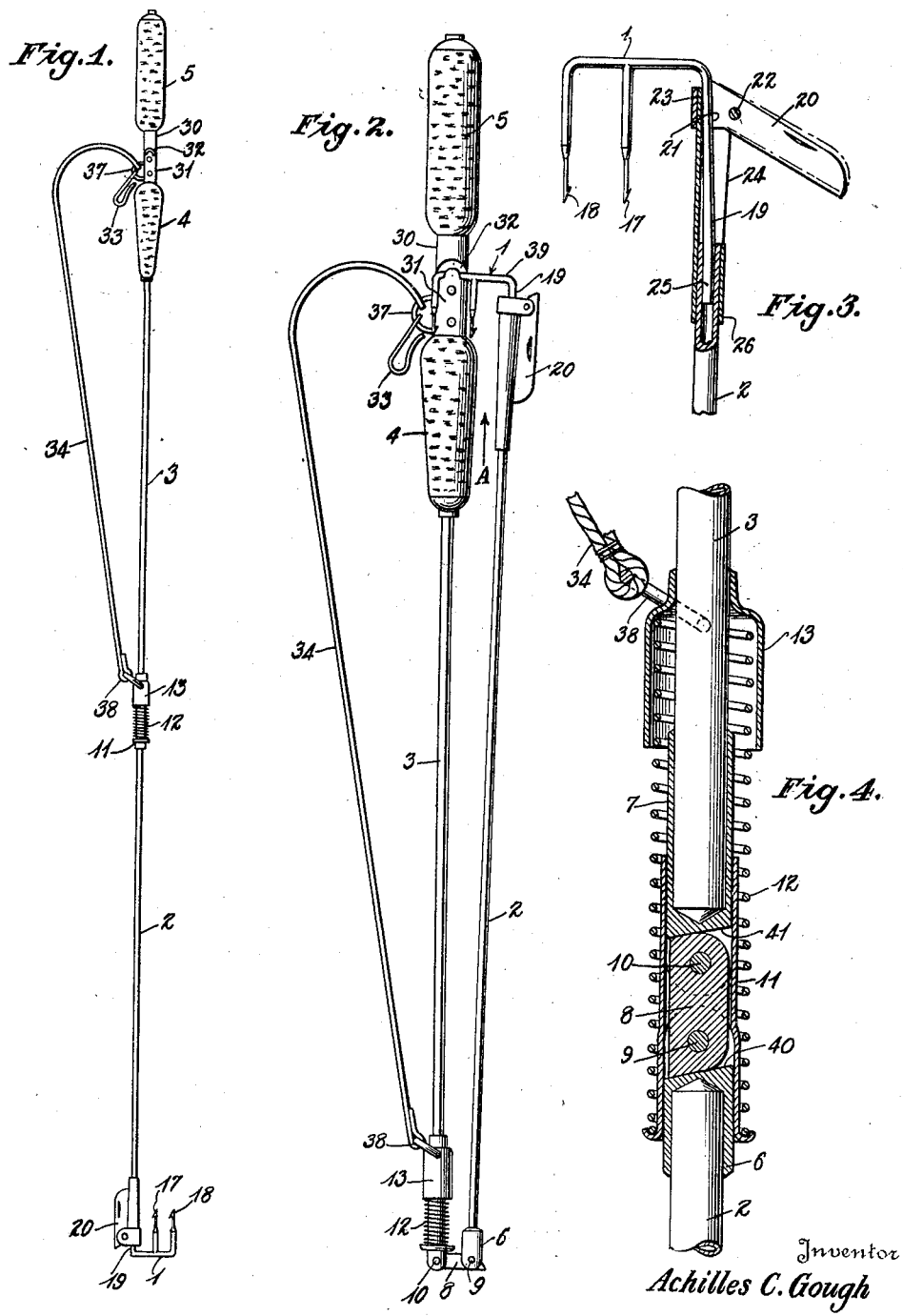
Inventor
Achilles C. Gough
By Bacon & Thomas
Attorneys Aug. 11, 1931.  A. C. GOUGH  1,818,474
GAFF HOOK
Filed Aug. 10, 1928  2 Sheets-Sheet 2
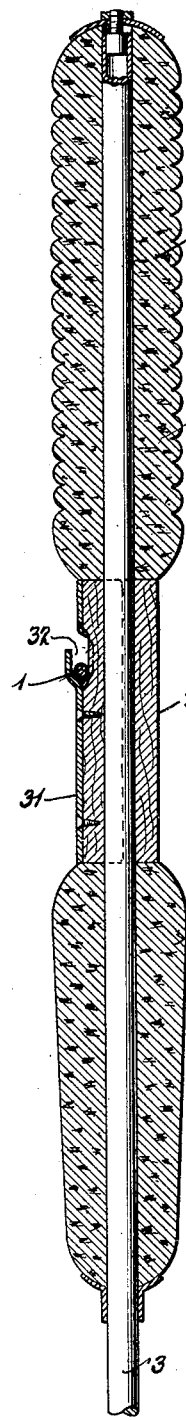
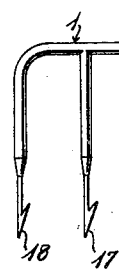
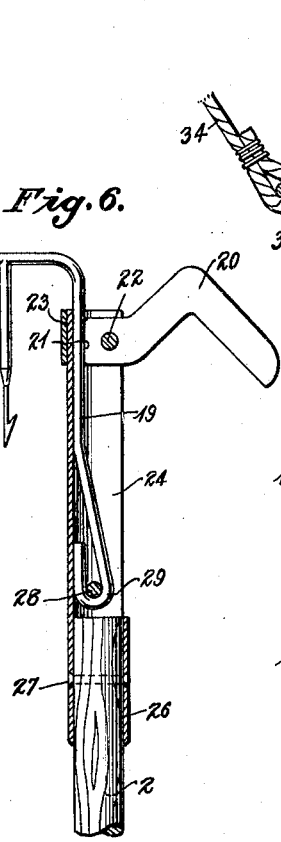
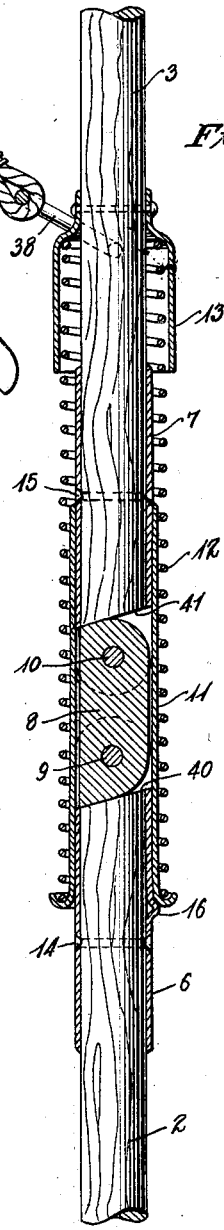
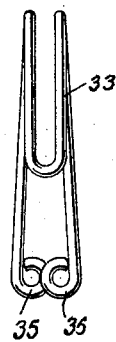
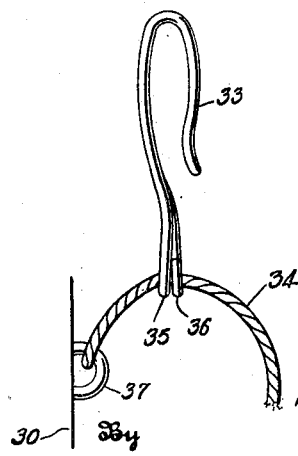
Inventor
Achilles C. Gough
By
Bacon & Thomas
Attorneys Patented Aug. 11, 1931

1,818,474

UNITED STATES PATENT OFFICE

ACHILLES C. GOUGH, OF POCATELLO, IDAHO

GAFF HOOK

Application filed August 10, 1928. Serial No. 298,777.

The first object of the invention is to provide a new and improved gaff hook that may be used for gaffing all sizes of game fish with a maximum of ease and convenience.

A further object in view is to provide a new and improved means in combination with an improved gaff hook for pruning or pulling down branches with which a fresh water lure may have become entangled during the act of casting, or for cutting or pulling roots or branches with which the said lure may become entangled during the act of retrieving.

A still further object in view is to provide a new and improved combination gaff hook and pruning hook of such design and construction that the device may be folded into a compact and convenient form for carrying while the same is not in active use, and that the staff may be instantly and easily extended to full length when it is desired to use the said device for any of the various purposes to which it is adapted.

Another object in view is to provide improved means for carrying a new and improved folding gaff hook, whereby the same may be carried in a variety of positions according to the convenience and wishes of the user. Other objects will appear as the description proceeds.

In the accompanying drawings which form a part of my application—

Figure 1 is a side elevational view of my improved combination gaff hook and retrieving hook showing it in extended form ready for use.

Figure 2 is a side elevational view of my improved combination gaff hook and retrieving hook folded in a convenient form for carrying, when the same is not in active use.

Figure 3 is an enlarged fragmentary view partly in section showing in detail one form of the gaff hook proper and adjacent parts of my improved combination gaff hook and retrieving hook.

Figure 4 is an enlarged fragmentary view partly in section showing in detail the improved joint which provides for folding the staff sections of my improved combination gaff hook and retrieving hook.

Figure 5 is an enlarged fragmentary view partly in section of the grip at the end of the handle provided for convenience in manipulation of my improved combination gaff hook and retrieving hook.

Figure 6 is an enlarged fragmentary view partly in section showing in detail the gaff hook proper and the adjacent parts of a slightly different form of my improved combination gaff hook and retrieving hook.

Figure 7 is an enlarged fragmentary view partly in section showing in detail a slightly different form of the improved joint which provides for folding the staff sections of my improved combination gaff hook and retrieving hook.

Figures 8 and 9 are front and side views, respectively, of the carrying hook.

Like characters of reference are used throughout the following specification and accompanying drawings to designate corresponding parts.

In the particular embodiment shown in the accompanying drawings 1 indicates the gaff hook proper while 2 indicates the hook bearing section of the handle to which the gaff hook 1 is attached and 3 represents the handle-bearing section of the staff. A grip consisting of two parts 4 and 5 is secured at the upper end of part 3.

The form of staff sections shown in Figure 4 are connected by an improved joint which will be described as follows:

The hook and handle bearing sections 2 and 3 have suitably fastened to their adjacent ends reinforcing ferrules 6 and 7 respectively. The free ends of these ferrules are provided with apertured ears carrying pins 9 and 10 to which are pivoted the ends of a link 8. A thimble 11 is slidably mounted over the ferrules 6 and 7 and the link 8. The end of the thimble presented to the hook bearing section 2 is rolled outwardly to form a seat for one end of the compression spring 12 which encircles the thimble and is received at its opposite end in a conjunctive supporting part or open-ended casing 13.

When the parts 2 and 3 are made of flexible metal the ferrules 6 and 7 and the element 13 may be secured to them by means of soldering or brazing. The outside diameter of the ferrule 6 and corresponding inside diameter of the thimble 11 may be made substantially greater than the corresponding dimension of the ferrule 7, so as to provide a stop to limit the movement of the thimble 11 by the spring 12. When the parts 2 and 3 are made of wood, as in Fig. 7, the metal ferrules 6 and 7 may be secured to them, respectively, by means of rivets 14 and 15. In either case, the thimble may be stopped in its movement by a projection 16 from the wall of the part 6, as shown in this figure.

A gaff hook having two or more points may be used, and the points of the hook should be reduced and provided with small barbs, see 17 and 18, Figures 1, 2, 3 and 6. I secure the gaff hook at the outer end of part 2 in such relation to its conjunctive parts that the shank 19 of the hook, or one of the hooks, may function as a back-spring for the knife blade, or pruning hook 20 which is mounted over, or beside the gaff hook 1. The part 20 is carried, when not in active use, in a folded position, as shown in Figures 1 and 2, and the said part is supported in that relation by means of the elastic force exerted by the shank 19 against the point 21. When it is desired to use the part 20 for pruning a branch above or below the surface of the water, with which the fresh water lure has become entangled, the said part may be opened to the position shown in Figure 3. When the part 20 is in use the force applied will cause the said part to swing slightly further around the rivet 22 until the shank 19 is forced against the inner wall at 23 of the tip 24.

To avoid making the other portions of the tip 24 excessively heavy the outer end of the same may be reinforced, as shown at 23, Figures 2 and 3 and the rivet 22 for the part 20 mounted thereon. When the section 2 is made of flexible metal tubing the end 25 of the gaff hook and the end 26 of the tip 24 may be secured to the said tubing by soldering or brazing. When the section 2 is made of wood the end 26 of the tip 24, see Figure 6, may be secured to the same by means of a rivet 27, and the hook 1 may be secured by means of another rivet 28 which passes through the tip 24 and an eye, or loop 29 of said hook.

The grips 4 and 5 may be either cork or wood. When the handle is made of wood the parts 4, 5, and 30 may be integral, and the same may be secured to section 3 in any common manner. When the sections 2 and 3 are made of metal it is desirable to use cork grips 4 and 5, large enough to float the device. The surface of the grip may be smooth as shown in Figures 1 and 2, or the said surface may be scored as shown at 5, Figure 5. The part 4 serves another purpose in that it sheathes, or protects the points of the gaff hook. The block 30 is partially or wholly covered by a close fitting metal piece 31 which is cut at one place to form a lip offset from a flattened portion of the block to form a recess 32 which receives the cross part of the hook 1 when the said hook is not in active use. The hook 1 is held securely in place within the recess 32 by means of the tension of the compression coil spring 12.

The hook 33 and the sling 34 are provided for carrying the device. The carrying hook 33 is formed from a wire having suitable physical characteristics for this purpose. The eyes in the ends 35 and 36 on the said hook should not fit loosely on the cord, small, flat or twisted chain or strap 34, but may slip easily when the ends 35 and 36 are pressed together until they coincide. The said hook will be retained in any desired position upon the said cord, or strap by means of the binding action between the ends 35 and 36. The upper end of the sling 34 may be connected at 37 and the other end may be connected at 38, as shown.

My improved combination gaff hook and retrieving hook may be operated advantageously as follows:

To unfold the device, grasp the part 5 in the hand with the gaff hook 1 turned downward and place the tip of a finger against the cross part of the hook 1 at the point 39, Fig. 2, pressing with the finger upon the hook at this point as though the latter were a trigger. Pressure at the point 39 in the direction of the arrow A will release the gaff hook 1 from the recess 32, when the said hook may be allowed to swing downward and forward until part 2 comes into alignment with part 3 which will permit the compression spring 12 to force the locking thimble 11 into place, thus rigidly locking the parts 2 and 3 in alignment. The handle of this device folds in one direction only. In the other direction, movement of the part 2 is limited by contact of the ends of the link 8 with the adjacent parts of the ferrules 6 and 7, as shown at 40 and 41. To fold the device, grasp with one hand the grip 5, the gaff hook 1 being turned downward, then grasp the other hand the outer end of thimble 11 and pull the same back towards part 13 until the part 8 is free, when the part 2 will swing downward. Then, part 2 may be grasped by the hand and the cross part of the hook 1 returned to the recess 32.

The gaff hooks of a size suitable for gaffing large fish are not suited for gaffing very small fish, as the hooks may pass over, or around the small fish without penetration. This common difficulty may be removed by adding more points to the gaff hook. If the points of a multiple pointed gaff hook be provided with only small barbs the same may be removed from the fish that has been gaffed without difficulty and without much injury to the appearance of the same, and the smaller, sharper points renders it practicable to gaff the smaller sizes of fish. After the device has been unfolded, it may be used in the same manner as a gaff hook of the common type, except the multiple number of points of the hook will render it possible to strike a small fish more surely than can be done with a hook having only one point.

The knife, or pruning hook 20 may be opened in the same manner as the blade of a common knife. The extra length of the staff of the device when extended makes it possible to reach to a considerable height above the surface of the water or below the surface of the water to release an entangled lure, by cutting off or pulling within reach the offending branches or roots.

The device, when folded, may be easily attached to the belt of the user or to the fish basket harness by means of the hook 33, and the same may be applied or removed with the use of only one hand. Under conditions where the device is being used with greater frequency, the same may be carried, or supported by placing the sling 34 over the wrist or forearm of the user.

It will be evident that a gaff hook of the type disclosed may have a universal application and the retrieving hook will be useful on streams or lakes having brush along the banks, but the retrieving implement may be omitted and other changes and detail of construction may be resorted to without departure from the spirit of the invention.

Having thus described the invention, what I claim is:

1. A gaff hook comprising a pair of pivotally connected staff sections, a double grip handle formed on one section, a hook carried by the other section and located a proper distance from the point of pivotal connection for said sections to position the hook between said grips when the sections are folded, and means positioned between and spacing the elements of the double grip for releasably securing the hook to the staff when in its folded position.

2. A gaff hook comprising a pair of pivotally connected staff sections, a double grip handle formed on one section, a hook carried by the other section and located a proper distance from the point of pivotal connection for said sections to position the hook between said grips when the sections are folded, and means for reasonably securing the hook to the staff when in its folded position, said means comprising a block on the staff and having a flattened portion, and a metal piece having a lip offset from and overlying said flattened portion.

3. In a folding gaff hook, the combination with a hook having a resilient shank, means for supporting the hook, of a retrieving tool comprising a folding blade mounted to engage the shank of said hook, to place the said shank under tension, means carried by the tool for engaging the tension hook shank to retain the tool in a folded position when not in use, and means carried by the tool for engaging the tension hook shank to retain the tool in the normal position of use.

4. A gaff hook comprising a folding staff having sections connected by a double pivoted link and locking means for holding the sections extended, said means comprising a thimble encircling the staff and movable into and out of a position enclosing said link and the adjacent ends of the staff sections, an abutment on said thimble, a second abutment on the staff, a stop carried by one of the staff sections and engaging the second abutment to limit the movement of the thimble and a spring encircling the thimble and bearing at its ends against said abutments to normally locate the thimble in the aforesaid position.

5. A gaff hook comprising a folding staff having sections connected by a double pivoted link and locking means for holding the sections extended, said means comprising a thimble encircling the staff and movable into and out of a position enclosing said link and the adjacent ends of the staff sections, an abutment on said thimble, a second abutment on the staff, and a spring encircling the thimble and bearing at its ends against said abutments to normally locate the thimble in the aforesaid position, the second abutment comprising an open ended casing for partially housing the spring.

6. A gaff hook comprising a folding staff having sections connected by a double pivoted link, and locking means for holding the sections extended, said means comprising a thimble encircling the staff and movable into and out of a position enclosing said link and the adjacent ends of the staff sections, said thimble having an outwardly rolled end to form a combined abutment and operating grip, a second abutment on the staff, and a spring encircling the thimble and bearing at its ends against said abutments to normally locate the thimble in the aforesaid position.

7. A gaff hook comprising a folding staff having sections connected by a double pivoted link, and locking means for holding the sections extended, said means comprising a thimble encircling the staff and movable into and out of a position enclosing said link and the adjacent ends of the staff sections, said thimble having an outwardly rolled end to form a combined abutment and operating grip, a second abutment on the staff, and a spring encircling the thimble and bearing at its ends against said abutments to normally locate the thimble in the aforesaid position, the second abutment comprising an open ended casing for partially housing the spring.

8. A gaff hook comprising a folding staff having sections connected by ferrules which are mounted on the adjacent ends of the sections, a link pivoted to said ferrules, and locking means for holding the sections extended, said means comprising a thimble encircling the staff and movable into and out of a position enclosing said link and the adjacent ends of the staff sections, an abutment on said thimble, a second abutment on the staff constituting a partial housing for a spring, and a spring encircling the thimble and bearing at its ends against said abutments to normally locate the thimble in the aforesaid position.

9. A gaff hook comprising a folding staff having sections connected by a double pivoted link and locking means for holding the sections extended, said means comprising a thimble encircling the staff and movable into and out of a position enclosing said link and the adjacent ends of the staff sections, an abutment on said thimble, a second abutment on the staff constituting a partial housing for a spring, and a spring encircling the thimble and bearing at its ends against said abutments to normally locate the thimble in the aforesaid position, and means for limiting the movement of the thimble under the influence of the spring.

10. A gaff hook comprising a pair of pivotally connected staff sections, a double grip handle formed on one section, a hook carried by the other section and located a proper distance from the point of pivotal connection for said sections to position the hook between said grips when the sections are folded, and means for releasably securing the hook to the staff when in its folded position, said means comprising a block conjunctive to the said grips and concentric with the staff having a flat side, and a metal piece on said block having a lip shaped to form a recess between the said flattened side and the lip.

11. A gaff hook comprising a pair of pivotally connected staff sections, a handle formed on one section, a hook carried by the other section and located a proper distance from the point of pivotal connection for said sections to position the hook below the main grip of the said handle when the sections are folded, and means for releasably securing the hook to the staff when in its folded position, said means comprising a block contiguous to the said main grip and concentric with the said staff having a flat side, and a metal piece on said block having a lip shaped to form a recess therebetween and the said flat side.

In testimony whereof I affix my signature.

ACHILLES C. GOUGH.